UNITED STATES PATENT OFFICE.

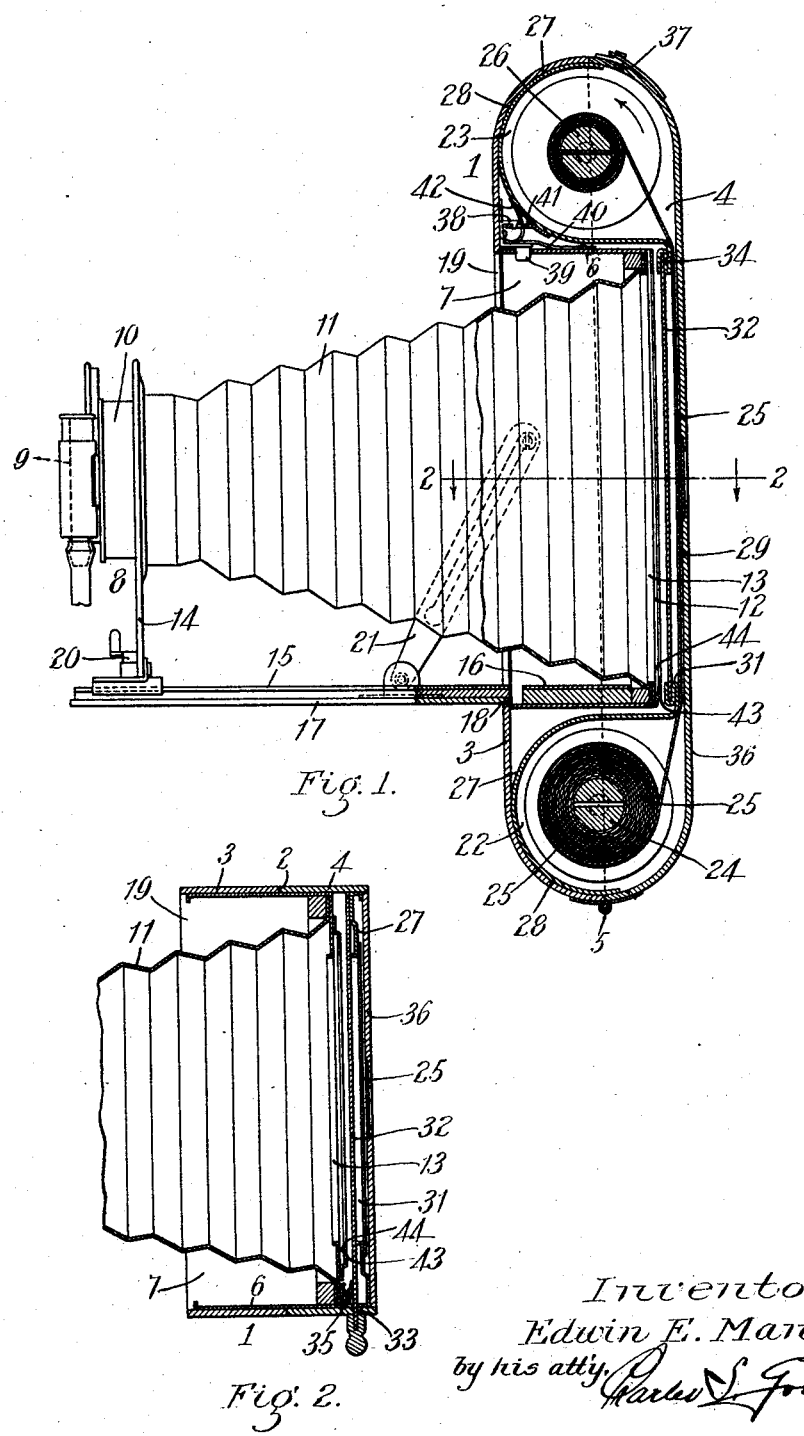

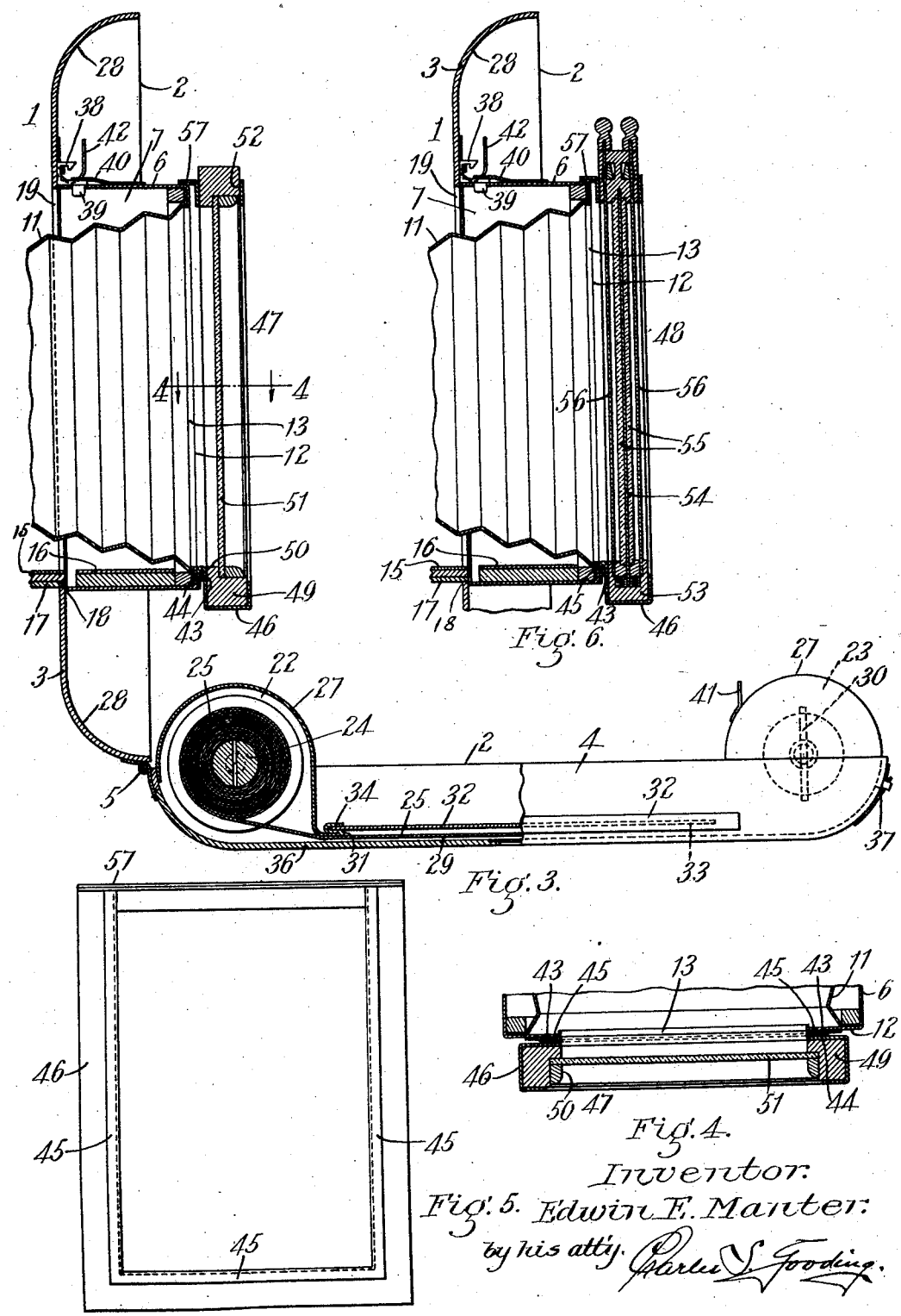

EDWIN E. MANTER, OF AUBURNDALE, MASSACHUSETTS.

CAMERA.

1,421,092.  Specification of Letters Patent.  Patented June 27, 1922.

Application filed November 19, 1920. Serial No. 425,099.

*To all whom it may concern:*

Be it known that I, EDWIN E. MANTER, a citizen of the United States, residing at Auburndale, in the county of Middlesex and State of Massachusetts, have invented new and useful Improvements in Cameras, of which the following is a specification.

This invention relates to an improvement in cameras.

The object of the invention is to so construct a camera that the same may employ either rolls of films or photographic plates, provision being made for focusing the objects to be photographed upon a focusing screen in the event of the use of either films or plates thereby eliminating the necessity of estimating the distance between said objects and the camera, and employing a focusing scale, and furthermore using a view finder generally required when films are used.

It is also an object of the invention to accomplish the above results without increasing the size of the camera over cameras adapted to take a picture of equal size not embodying the above features, the said camera furthermore being so constructed that it may be opened for the purpose of focusing with the film in position for exposure for a picture without prematurely admitting light to the film compartment, and thereby injuring the film or rendering it useless.

It is still further an object of the invention to provide a frame which may be applied to the camera when open and into which the focusing screen or plate holder may be inserted as desired.

The invention consists in the combination and arrangement of parts set forth in the following specification and particularly pointed out in the claims thereof.

Referring to the drawings:

Figure 1 is a side elevation of a camera embodying my invention, the same being partly broken away and illustrated in section.

Fig. 2 is a horizontal section taken on the line 2—2 of Fig. 1.

Fig. 3 is a vertical section partly in elevation of a portion of the camera, the casing thereof being open, with the detachable frame applied to the rear of the front section thereof, and the focusing screen being in position in said frame.

Fig. 4 is a horizontal section taken on the line 4—4 of Fig. 3.

Fig. 5 is a front elevation of the detachable frame which receives the focusing screen and the plate holders.

Fig. 6 is a vertical section, similar to Fig. 3, of a portion of the camera illustrating a double plate holder in position in the detachable frame.

Like numerals refer to like parts throughout the several views of the drawings.

In the drawings, 1 represents a casing constructed preferably of any suitable sheet material and divided longitudinally thereof at 2 in a plane at right angles to the focal axis of the lens into two sections 3 and 4 which are hinged together at 5. The section 3 constitutes the front portion of the casing 1, and to the inner surface thereof is secured a partition 6 which constitutes the wall of a chamber 7. The camera is provided with the usual light projecting instrumentalities 8 which includes a lens 9 and shutter mechanism 10, all well known to those skilled in the art, which are connected by the usual bellows 11 with a rear wall 12 of the partition 6 in which an opening 13 is provided. The light projecting instrumentalities 8 are mounted upon a bracket 14 adapted to slide upon ways 15 and 16 provided upon the inner side of a door 17 and upon the lower wall of the chamber 7 respectively. The door 17 is pivoted at 18 and when the camera is not in use, said door closes an opening 19 at the forward end of the chamber 7, and the light projecting instrumentalities 8 and bellows 11 are located within the chamber 7, the bellows being in its collapsed position. At this time the bracket 14 is mounted upon the ways 16, being clamped thereto by means of a lever 20.

In Figure 1 the door 17 is illustrated open, being held in a horizontal position by a support 21, while the bracket 14 has been moved forward upon the ways 15 to locate the light projecting instrumentalities 8 in a position to take a picture.

All the mechanism thus far described is old and well known in the art with the exception of the casing 1, and the novelty of this invention resides in the construction of said casing and the arrangement of the film compartment located within said casing and carried by the rear section 4 thereof whereby the hereinbefore mentioned objects may be accomplished without increasing the size of the camera over cameras adapted to take a picture of equal size or without changing the outward appearance of the camera.

Referring particularly to Figures 1 and 3, the rear section 4 is provided with chambers 22 and 23 at the opposite ends thereof adapted to receive spools 24 and 26 respectively, the spool 24 having a strip of film 25 wound therearound. The chambers 22 and 23 are identical in size and shape, being formed by providing a partition 27 of sheet material, the opposite ends of which are arranged concentric with the axes of the spools 24 and 26 and the curved ends of said partition 27 closely fit the inner adjacent surface 28 of the front section 3. The extremities of the partition 27 are securely fastened to the extremities of the rear section 4. The partition 27 co-operates with the end portions of the rear section 4 to form the chambers 22 and 23 and said chambers are connected with each other by a passage 29 which is located adjacent to the rear wall of the section 4. The chambers 22 and 23 and passage 29 combine to form a film compartment in which the film is transferred from the spool 24 to the spool 26 as the pictures are taken in a manner well known to those skilled in the art, the spool 26 being rotated by means of a thumb piece 30 to feed the film for the successive pictures.

The film 25 while being transferred through the passage 29 from the spool 24 to the spool 26 passes in the rear of an opening 31 provided in the partition 27. The opening 31 is closed by a slide 32, except at such times as it is desired to take a picture, when it is removed. The slide 32 is inserted through a slot 33 provided in the rear section 4 of the casing 1, and slides in grooves 34 formed by bending the partition 27 upon opposite sides of the opening 31. Light is prevented from entering the slot 33, when the slide 32 is removed, by a spring actuated gate 35, the operation of which is well known to those skilled in the art and similar to those employed in plate holders.

A cover 36 is detachably secured at the rear of the rear section 4 in any desired manner, being held in its closed position by a pair of fastening devices 37. The spools 24 and 26 are inserted and removed from the film chambers 22 and 23 respectively, in the well known manner, when the cover 36 is removed.

The rear section 4 is locked to the front section 3 to prevent said sections from opening upon the hinge 5 by a latch 38, which is slidably mounted upon the section 3, and which is provided with a push button 39 which projects through the partition 6 into the chamber 7. A flat spring 40 holds the latch 38 in locking engagement with a projection 41 which is secured to the partition 27 of the section 4, thereby locking said sections together as illustrated in Figure 1. Another flat spring 42 fast to the inner surface of the front section 3 contacts with the partition 27 of the section 4 when said sections are closed, as illustrated in Figure 1, and acts to force said sections apart a short distance when they are released by the latch 38.

Fast to the rear wall 12 of the partition 6 and extending around said wall adjacent to three sides of the opening 13 is a flange 43 which forms a groove 44 adapted to receive a flange 45 formed upon a frame 46, illustrated in detail in Figure 5, which is detachably secured to the rear wall 12 through the co-operation of said flanges when the sections 3 and 4 are in the position illustrated in Figure 3. The frame 46 is constructed of sheet material and is adapted to receive either a focusing screen 47, as illustrated in Figures 3 and 4, or a plate holder 48, as illustrated in Figure 6. The focusing screen 47 embodies therein a frame 49 having an opening 50 extending therethrough which is the size and shape of the picture to be taken, while a ground glass plate 51 extends across said opening, the objects to be photographed being focused thereon. The focusing screen 47 is slid edgeways into the frame 46 through an opening 52 provided in one side of said frame. The plate holder illustrated in section in Figure 6 is a standard type double plate holder well known to all skilled in the art, 53 being the frame thereof, 54 the partition, 55 the photographic plates and 56 the slides. The plate holder 48 is slid edgeways in the frame 46 in a manner similar to the focusing screen 47. To prevent light from entering the space between the frame 46 and the casing and striking the photographic plates when the plate holder is used a guard 57 is attached to said frame, the said guard contacting with the side of the casing as illustrated in Figure 6, and thereby closing any crack through which light might enter.

The general operation of my improved camera is as follows: When it is desired to take a picture, the door 17 is released in the usual well known manner and dropped to the position illustrated in Figure 1, and the light projecting instrumentalities 8 and the bellows 11 are moved from their collapsed position within the chamber 7 to approximately the position illustrated in Figure 1. A finger is then placed upon the push button 39 and the latch 38 released from engagement with the projection 41, whereupon the spring 42 will force the adjacent end of the rear section 4 away from the front section 3 a short distance, after which the said rear section is moved to the position illustrated in Figure 3. The frame 46 is then attached to the rear wall 12 of the partition 6 by sliding the flange 45 of said frame into engagement with the flange 43 of said rear wall 12. The focusing screen 47 may be in position within the frame 46 when said frame is attached, or may be inserted within said frame after the frame has been attached. The objects to be photographed are then focused upon the ground glass 51 of the focusing screen in the usual well known manner and the light projecting instrumentalities then clamped in position by means of the lever 20 to the ways 15. If it is desired to take the photograph upon the photographic plates, the focusing screen 47 is removed from the frame 46, and the plate holder 48 inserted therein. One of the photographic plates 55 will then be located in the position formerly occupied by the ground glass plate 51. After the proper slide 56 has been removed, a photograph may be taken in the usual well known manner. After the plate 55 has been exposed, the slide 56 is again inserted and if it is desired to take another photograph from the same position, the plate holder may be removed from the frame 46 and reversed, and the operation repeated.

If, after the objects to be photographed have been focused, it is desired to take the photograph upon the film 25, which has previously been placed in position within the film compartment and which may always be in readiness therein, the frame 46 is removed from its position upon the rear wall 12, and the rear section 4 moved from the position illustrated in Figure 3 to the position illustrated in Figure 1 and locked in engagement with the front section 3. The film 25 is now located in the position formerly occupied by the ground glass plate 51. The slide 32 is then removed and the photograph taken in the usual well known manner, after which the slide 32 is again inserted. If it is desired to take another photograph upon the film from the same position, the film is advanced for the next exposure by turning the thumb piece 30 in the usual well known manner, and after again removing the slide 32, another picture may be taken. If it is intended to take successive pictures upon a film 25 from the same position without refocusing the camera, the same may be accomplished without inserting or removing the slide 32 between the successive exposures as the slide 32 is provided for preventing premature exposure of the film when the casing 1 is opened for the purpose of focusing the objects which are to be photographed.

A camera embodying my invention makes it possible to be able to take photographs upon either plates or films with the same camera without the necessity of providing separate attachments other than the frame 46 and without increasing in any way the size of the camera over other cameras adapted to take the same size picture not embodying the features of this invention. Furthermore by constructing a film camera in accordance with my invention it makes it possible to focus said camera when films are used without making it necessary to rely upon the graduated focusing scale and a view finder. This makes it possible to more accurately focus and position upon the film the objects which are being photographed.

I claim:

1. A camera embodying therein a casing divided into front and rear sections hinged together at one end thereof, means to lock said sections together at the other end thereof, means to force said sections apart at one end thereof when said sections are unlocked, light projecting instrumentalities mounted upon said front section, said rear section constituting a film compartment and being provided with an opening across which a film is adapted to be fed and through which light may be projected by said light projecting instrumentalities and a slide adapted to close said opening and thereby prevent light from entering said film compartment when said casing is opened upon said hinge.

2. A camera embodying therein a casing divided into front and rear sections adapted to be separated, light projecting instrumentalities mounted upon said front section, a partition located within said front section and provided with an opening therein through which light may be projected by said light projecting instrumentalities, said rear section constituting a film compartment and being provided with an opening across which a film is adapted to be fed and through which light may be projected by said light projecting instrumentalities, a slide adapted to close said last named opening and thereby prevent light from entering said film compartment when the sections of said casing are separated and a frame having sliding engagement with the rear of said partition when said sections are separated, said frame being adapted to receive either a focusing screen or a plate holder.

3. A camera embodying therein a casing divided into front and rear sections hinged together, light projecting instrumentalities mounted upon said front section, a partition located within said front section and provided with an opening therein through which light may be projected by said light projecting instrumentalities, said rear section constituting a film compartment and being provided with an opening across which a film is adapted to be fed and through which light may be projected by said light projecting instrumentalities, a slide adapted to close said last named opening and thereby prevent light from entering said film compartment when said rear section is separated from said front section, and a frame having sliding engagement with the rear of said partition when said sections are separated, said frame having a glass plate mounted therein adapted to receive the rays of light from said light projecting instrumentalities.

4. A camera embodying therein a casing divided into front and rear sections hinged together, light projecting instrumentalities mounted upon said front section, a partition located within said front section and provided with an opening therein through which light may be projected by said light projecting instrumentalities, said rear section constituting a film compartment and being provided with an opening across which a film is adapted to be fed and through which light may be projected by said light projecting instrumentalities, flanges upon the rear of said partition, a slide adapted to close said last named opening and thereby prevent light from entering said film compartment when said rear section is separated from said front section and a frame adapted to engage said flanges when said sections are separated, said frame having means detachably mounted therein adapted to receive the rays of light from said light projecting instrumentalities.

5. A camera embodying therein a casing divided into sections hinged together, light projecting instrumentalities mounted upon one of said sections, the other of said sections constituting a light proof film compartment, a plurality of spools mounted within said film compartment, adapted to have a film thereon, means to transfer said film from one to the other of said spools, means to separate said sections upon said hinge during the transfer of said film without exposing said film to light and a frame having engagement with one of said sections adapted to receive either a focusing screen or a plate holder.

6. A camera embodying therein a casing divided into front and rear sections hinged together at one end thereof, means to lock said sections together at the other end thereof, means to force said sections apart at one end thereof when said sections are unlocked, light projecting instrumentalities mounted upon said front section, a partition located within said front section and provided with an opening therein through which light may be projected by said light projecting instrumentalities, said rear section constituting a film compartment and embodying therein a plurality of chambers and a passage extending therebetween, a spool mounted within each chamber, adapted to have a film thereon, means to transfer said film from one to the other of said spools, said rear section also being provided with an opening therein through which light may be projected by said light projecting instrumentalities, a slide adapted to close said last named opening and a frame having sliding engagement with the rear of said partition when said sections are separated, said frame being adapted to receive either a focusing screen or a plate holder.

In testimony whereof I have hereunto set my hand in presence of two subscribing witnesses.

EDWIN E. MANTER.

Witnesses:
FRANKLIN E. LOW,
KATHYRN M. JOYCE.